US007366928B2

(12) United States Patent
Park

(10) Patent No.: US 7,366,928 B2
(45) Date of Patent: Apr. 29, 2008

(54) VOLTAGE REGULATION CONTROL UNIT FOR DETERMINING A PERCENT VOLTAGE REGULATION OF A CPU CORE VOLTAGE BASED ON A SPEC SIGNAL FROM THE CPU

(75) Inventor: Seong-geun Park, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 515 days.

(21) Appl. No.: 10/866,104

(22) Filed: Jun. 14, 2004

(65) Prior Publication Data
US 2005/0039059 A1 Feb. 17, 2005

(30) Foreign Application Priority Data
Jun. 12, 2003 (KR) .................. 10-2003-0038003

(51) Int. Cl.
G06F 1/26 (2006.01)
(52) U.S. Cl. ...................... 713/310; 713/300
(58) Field of Classification Search .............. 713/1, 713/100, 300, 310, 340
See application file for complete search history.

(56) References Cited

U.S. PATENT DOCUMENTS

| 4,829,459 | A | 5/1989 | McNutt | |
|---|---|---|---|---|
| 5,568,424 | A | 10/1996 | Cernea et al. | |
| 6,480,367 | B2 | 11/2002 | Shi et al. | |
| 6,735,706 | B2 * | 5/2004 | Tomlinson et al. | 713/300 |
| 6,970,794 | B2 * | 11/2005 | Sutardja | 702/65 |

2002/0087906 A1 7/2002 Mar et al.

FOREIGN PATENT DOCUMENTS

| JP | 10307651 | 11/1998 |
|---|---|---|
| JP | 2000-122753 | 4/2000 |
| JP | 2001-34502 | 2/2001 |
| KR | 1998-017372 | 6/1998 |
| KR | 1998-028730 | 7/1998 |
| KR | 1998-0563686 | 9/1998 |
| KR | 1998-065636 | 12/1998 |
| KR | 1999-0068883 | 9/1999 |
| KR | 1999-0069968 | 9/1999 |
| KR | 2003-0088732 | 11/2003 |

OTHER PUBLICATIONS

Office Action issued by the Korean Intellectual Property Office on Jul. 29, 2005.

* cited by examiner

Primary Examiner—Rehana Perveen
Assistant Examiner—Paul Yanchus, III
(74) Attorney, Agent, or Firm—Staas & Halsey LLP

(57) ABSTRACT

A voltage regulator module (VRM) and a voltage regulating system for a CPU. The VRM supplies a supply core voltage corresponding to a VID signal output from the CPU. A core voltage generator generates the core voltage and a voltage regulation control unit controls the core voltage based on a spec signal which decides a percent voltage regulation of the core voltage, the core voltage having the percent voltage regulation corresponding to the spec signal, which is output by the CPU. The VRM and the voltage regulating system according to the present invention supply a stable core voltage that the CPU requires, regardless of a class of the CPU, by receiving information on the voltage the CPU requires from the CPU.

24 Claims, 6 Drawing Sheets

FIG. 6

| Processor Pins (0=low, 1= high) | | | | | Vcc | Processor Pins (0=low, 1= high) | | | | | Vcc |
|---|---|---|---|---|---|---|---|---|---|---|---|
| VID4 | VID3 | VID2 | VID1 | VID0 | (VDC) | VID4 | VID3 | VID2 | VID1 | VID0 | (VDC) |
| 1 | 1 | 1 | 1 | 1 | Off | 0 | 1 | 1 | 1 | 1 | 1.475 |
| 1 | 1 | 1 | 1 | 0 | 1.1 | 0 | 1 | 1 | 1 | 0 | 1.5 |
| 1 | 1 | 1 | 0 | 1 | 1.125 | 0 | 1 | 1 | 0 | 1 | 1.525 |
| 1 | 1 | 1 | 0 | 0 | 1.15 | 0 | 1 | 1 | 0 | 0 | 1.55 |
| 1 | 1 | 0 | 1 | 1 | 1.175 | 0 | 1 | 0 | 1 | 1 | 1.575 |
| 1 | 1 | 0 | 1 | 0 | 1.2 | 0 | 1 | 0 | 1 | 0 | 1.6 |
| 1 | 1 | 0 | 0 | 1 | 1.225 | 0 | 1 | 0 | 0 | 1 | 1.625 |
| 1 | 1 | 0 | 0 | 0 | 1.25 | 0 | 1 | 0 | 0 | 0 | 1.65 |
| 1 | 0 | 1 | 1 | 1 | 1.275 | 0 | 0 | 1 | 1 | 1 | 1.675 |
| 1 | 0 | 1 | 1 | 0 | 1.3 | 0 | 0 | 1 | 1 | 0 | 1.7 |
| 1 | 0 | 1 | 0 | 1 | 1.325 | 0 | 0 | 1 | 0 | 1 | 1.725 |
| 1 | 0 | 1 | 0 | 0 | 1.35 | 0 | 0 | 1 | 0 | 0 | 1.75 |
| 1 | 0 | 0 | 1 | 1 | 1.375 | 0 | 0 | 0 | 1 | 1 | 1.775 |
| 1 | 0 | 0 | 1 | 0 | 1.4 | 0 | 0 | 0 | 1 | 0 | 1.8 |
| 1 | 0 | 0 | 0 | 1 | 1.425 | 0 | 0 | 0 | 0 | 1 | 1.825 |
| 1 | 0 | 0 | 0 | 0 | 1.450 | 0 | 0 | 0 | 0 | 0 | 1.85 |

VOLTAGE REGULATION CONTROL UNIT FOR DETERMINING A PERCENT VOLTAGE REGULATION OF A CPU CORE VOLTAGE BASED ON A SPEC SIGNAL FROM THE CPU

CROSS-REFERENCE TO RELATED APPLICATIONS

This application claims the benefit of Korean Patent Application No. 2003-38003, filed Jun. 12, 2003, in the Korean Intellectual Property Office, the disclosure of which is incorporated herein by reference.

BACKGROUND OF THE INVENTION

1. Field of the Invention

The present invention relates to a voltage regulator module (VRM) and a voltage regulating system of a central processing unit (CPU), and more particularly, to a VRM and a voltage regulating system that supply stable voltage required in the CPU, regardless of a class of the CPU, by receiving information on the required voltage from the CPU.

2. Description of the Related Art

A Central Processing Unit (CPU) of a computer requires core voltage to function. Therefore, a Voltage Regulator Module (VRM) transforms an input voltage to supply the CPU with the core voltage corresponding to the CPU.

In PENTIUM® Pro class or higher CPUs from INTEL Co., a level of the core voltage that the CPU requires may vary according to the class of the CPU. The VRM supplies the required core voltage to the CPU by receiving several Voltage Identification (VID) Signals containing information on the level of the core voltage that the CPU requires.

FIG. 1 is a control block diagram of a conventional voltage regulating system of a CPU. The conventional voltage regulating system of the CPU comprises a CPU 100 with a plurality of VID pins through which a plurality of VID signals is transmitted, and a VRM 300 that receives the VID signals from the CPU 100 and supplies the CPU 100 with the core voltage corresponding to the VID signals.

The CPU 100 is supplied with a VID voltage by a VID regulator 200 to output the VID signals through the plurality of VID pins. The PENTIUM®4, a CPU from INTEL Co., is one of the CPUs that uses a 5 bit digital VID signals from 5 VID pins. FIG. 6 illustrates an exemplary relationship between the 5 bit VID signals from the CPU 100 and the level of the core voltage from the VRM 300. As illustrated therein, the CPU 100 outputs the VID signals according to the information on the core voltage required in the CPU 100. On receiving the VID signals, the VRM 300 outputs the level of the core voltage to the CPU 100 corresponding to the VID signals.

The conventional voltage regulating system of the CPU 100 also includes a feedback/offset circuit 500. The feedback/offset circuit 500 transmits a feedback signal or an offset signal to the VRM 300, wherein each signal has two types based on logical signals (high and low) received from the CPU 100. Here, the VRM 300 stabilizes the level of the core voltage, and decides the offset value of the core voltage based on the feedback and the offset signal.

Also, a voltage control unit 130 of the VRM 300 outputs a PWM signal based on the VID signals from the CPU 100, the feedback signal, and the offset signal from the feedback/offset circuit 500. A core voltage generator 150 generates the core voltage based on the PWM signal from the voltage control unit 130.

In the conventional voltage regulating system of the CPU 100, the CPU 100 requires the core voltage with the offset value that varies according to the class of the CPU 100. As an example, to make the feedback/offset circuit 500 compatible with various CPUs, the feedback/offset circuit 500 should be capable of supporting various core voltages corresponding to the number of the CPUs, so the feedback/offset circuit 500 becomes complicated according as the number of core voltages that the feedback/offset circuit 500 should support is increased. More particularly, in a configuration of the conventional feedback/offset circuit 500 supplying two offset values, the conventional feedback/offset circuit 500 needs to be provided with more resistance elements to supply more various offset values, and more switching elements, such as field effect transistors (FETs) to select the offset value. However, the switching elements make supplying a stable core voltage harder, because the switching elements are affected by external circumstances such as manufacturing processes or temperature. Moreover, some delay in response time between the switching elements could have a bad effect on voltage regulation.

The configuration of the feedback/offset circuit 500 corresponding to every possible type of CPU 100 is hardly realizable. Therefore, in case that the voltage regulating system cannot support the level of the core voltage that the CPU 100 requires, the CPU 100 runs unstable.

FIG. 2 is a graph illustrating relationships between VID signals and a voltage Vcc in the CPU 100 when the conventional voltage regulating system can support the level of the core voltage that the CPU 100 requires. FIG. 3 is a graph illustrating relationships between the current and the voltage in the CPU 100 when the conventional voltage regulating system cannot support the level of the core voltage that the CPU 100 requires is shown in FIG. 3. As illustrated in FIG. 3, when the CPU 100 requires the level of the core voltage that the conventional voltage regulating system cannot support, the feedback/offset circuit 500 transmits the offset value incompatible with the offset value the CPU 100 requires. As a result, a percent voltage regulation differs from the value the CPU 100 requires. The percent voltage regulation, or the change rate of the voltage compared to the current applied to the CPU 100, corresponds to respective slopes of the voltage-current lines shown in FIG. 2 and FIG. 3. The voltage regulation percentages of maximum, optimal, and minimum voltages differ from each other, affecting the stable operation of the CPU 100.

SUMMARY OF THE INVENTION

Accordingly, it is an aspect of the present invention to provide a voltage regulator module and a voltage regulating system which supply a stable voltage required by a CPU, regardless of the class of the CPU, by receiving information on the required voltage from the CPU.

Additional aspects and/or advantages of the invention will be set forth in part in the description which follows and, in part, will be obvious from the description, or may be learned by practice of the invention.

The foregoing and/or other aspects of the present invention are achieved by providing a voltage regulator module (VRM) which receives a voltage identification (VID) signal from a central processing unit (CPU) to supply a core voltage corresponding to the VID signal for the CPU, the VRM comprising a core voltage generator which generates the core voltage; and a voltage regulation control unit which receives a specification (spec) signal determining percent voltage regulation of the core voltage from the CPU to control the core voltage generator to generate the core voltage having the percent voltage regulation corresponding to the spec signal.

According to an aspect of the invention, the voltage regulation control unit comprises a programmable register which outputs a percent voltage regulation compensation signal to compensate the core voltage, based on the spec signal; and a pulse width modulated (PWM) signal generator which outputs a PWM signal to control the core voltage generator to generate the core voltage having the percent voltage regulation corresponding to the spec signal, based on the percent voltage regulation compensation signal from the programmable register.

According to an aspect of the invention, the spec signal from the CPU is an analog signal, and the voltage regulation control unit further comprises a spec A/D converter which converts the analog spec signal into a digital spec signal to transfer the digital spec signal to the programmable register.

According to an aspect of the invention, the programmable register comprises a resistor array which outputs a plurality of resistance values; a counter register which stores the plurality of resistance values from the resistor array; and a control circuit unit which reads the resistance values corresponding to the spec signal from the counter register, to output the percent voltage regulation compensation signal corresponding to the read resistance values.

According to an aspect of the invention, the voltage regulation control unit further comprises a VID D/A converter which converts the VID signal into an analog VID signal; and a voltage level compensation unit which outputs a voltage level compensation signal to the PWM signal generator to compensate the level of the core voltage, by comparing a voltage corresponding to the analog VID signal with the core voltage from the core voltage generator.

According to an aspect of the invention, the voltage regulation control unit further comprises an adder which adds the percent voltage regulation compensation signal from the programmable register and the voltage level compensation signal from the voltage level compensation unit to transfer the added signal to the PWM signal generator.

According to another aspect of the present invention, the above and other aspects may be also achieved by providing a voltage regulator module (VRM) which receives a VID signal from a CPU to supply the CPU with core voltage corresponding to the VID signal, the VRM comprising a core voltage generator which outputs the core voltage; and a voltage regulation control unit which receives an offset signal which decides an offset value of the core voltage from the CPU to control the core voltage generator to generate the core voltage having the offset value corresponding to the offset signal.

According to an aspect of the invention, the voltage regulation control unit may comprise a programmable register which outputs an offset compensation signal to compensate the offset value of the core voltage, based on the offset signal from the CPU; and a PWM signal generator which outputs a PWM signal to control the core voltage generator to generate the core voltage having the offset value corresponding to the offset signal, based on the offset compensation signal from the programmable register.

According to an aspect of the invention, the offset signal from the CPU is an analog signal, and the voltage regulation control unit may further comprise an offset A/D converter which converts the analog offset signal into a digital offset signal to transfer the digital offset signal to the programmable register.

According to an aspect of the invention, the programmable register may comprise a resistor array which outputs a plurality of resistance values; a counter register which stores the plurality of resistance values from the resistor array; and a control circuit unit which reads the resistance values corresponding to the offset signal from the counter register to output the offset compensation signal corresponding to the read resistance values.

According to an aspect of the invention, the voltage regulation control unit may further comprise a VID D/A converter which converts the VID signal into the analog VID signal; and a voltage level compensation unit which outputs a voltage level compensation signal to the PWM signal generator to compensate the level of the core voltage, by comparing a voltage corresponding to the analog VID signal with the core voltage from the core voltage generator.

According to an aspect of the invention, the voltage regulation control unit may further comprise an adder which adds the offset compensation signal from the programmable register and the voltage level compensation signal from the voltage level compensation unit to transfer the added signal to the PWM signal generator.

According to another aspect of the present invention, the above and/or other aspects may be also achieved by providing a voltage regulator module (VRM) which receives a VID signal from a CPU to supply the CPU with a core voltage corresponding to the VID signal, the VRM comprising a core voltage generator which outputs the core voltage; and a voltage regulation control unit which controls the core voltage generator to generate the core voltage having a percent voltage regulation and an offset value corresponding to a spec signal and an offset signal, respectively, wherein the spec signal is received from the CPU to decide the percent voltage regulation and the offset signal is received from the CPU to decide the offset value of the core voltage.

According to an aspect of the invention, the voltage regulation control unit may comprise a programmable register which outputs an percent voltage regulation compensation signal and an offset compensation signal to compensate the percent voltage regulation and the offset value of the core voltage, respectively, based on the spec signal and the offset signal; and a PWM signal generator which outputs a PWM signal to control the core voltage generator to generate the core voltage having the percent voltage regulation and the offset value corresponding to the spec signal and the offset signal, respectively, based on the percent voltage regulation compensation signal and the offset compensation signal from the programmable register.

According to an aspect of the invention, at least one of the spec signal and the offset signal from the CPU is an analog signal, and the voltage regulation control unit may further comprise an A/D converter which converts the analog signal into a digital signal to transfer the digital signal to the programmable register.

According to an aspect of the invention, the programmable register may comprise a resistor array which outputs a plurality of resistance values; a counter register which stores the plurality of resistance values from the resistor array; and a control circuit unit which reads the resistance values from the counter register corresponding to the spec signal and the offset signal, respectively, to output the percent voltage regulation compensation signal and the offset compensation signal corresponding to the read resistance values.

According to an aspect of the invention, the voltage regulation control unit may further comprise a VID D/A converter which converts the VID signal into an analog VID signal; and a voltage level compensation unit which outputs a voltage level compensation signal to the PWM signal generator to compensate the level of the core voltage, by comparing voltage corresponding to the analogue VID signal with the core voltage from the core voltage generator.

According to an aspect of the invention, the voltage regulation control unit may further comprise an adder adding the percent voltage regulation compensation signal and the offset compensation signal output from the programmable register and the voltage level compensation signal from the voltage level compensation unit to transfer the added signal to the PWM signal generator.

According to another aspect of the present invention, the above and/or other aspects of the invention may be also achieved by providing a voltage regulating system for a CPU which outputs a VID signal which decides a level of a core voltage for operation, a spec signal which decides a percent voltage regulation of the core voltage, and an offset signal which decides an offset value of the core voltage, the voltage regulating system comprising a voltage regulator module (VRM) comprising a core voltage generator which outputs the core voltage and a voltage regulation control unit which controls the core voltage generator to generate the core voltage having the level of voltage, the percent voltage regulation, and the offset value corresponding to the VID signal, the spec signal, and the offset signal, respectively.

According to an aspect of the invention, the voltage regulation control unit of the VRM may comprise a programmable register which outputs the percent voltage regulation compensation signal and the offset compensation signal to compensate the percent voltage regulation and the offset value of the core voltage, based on the spec signal and the offset signal from the CPU; and a PWM signal generator which outputs a PWM signal to control the core voltage generator to generate the core voltage having the percent voltage regulation and the offset value corresponding to the spec signal and the offset signal, respectively, based on the percent voltage regulation compensation signal and the offset compensation signal from the programmable register.

According to another aspect of the present invention, the above and/or other aspect may be also achieved by providing a computer having the voltage regulating system of the above-described CPU.

BRIEF DESCRIPTION OF THE DRAWINGS

These and/or other aspects and advantages of the present invention will become apparent and more readily appreciated from the following description of the embodiments, taken in conjunction with the accompany drawings of which:

FIG. 6 is a table illustrating the relationship between VID signals from the CPU and the core voltages.

DETAILED DESCRIPTION OF THE PREFERRED EMBODIMENTS

Figure 1:
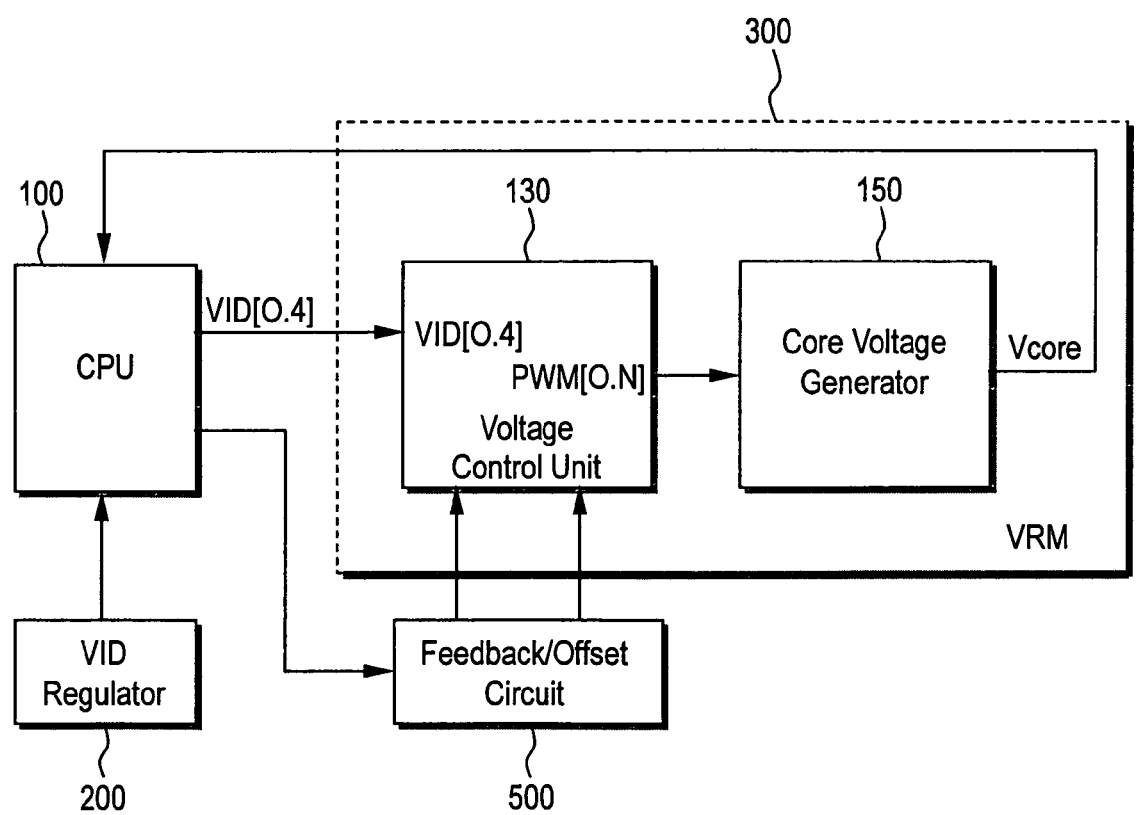
FIG. 1 is a control block diagram of a conventional voltage regulating system of a CPU.
Figure 2:
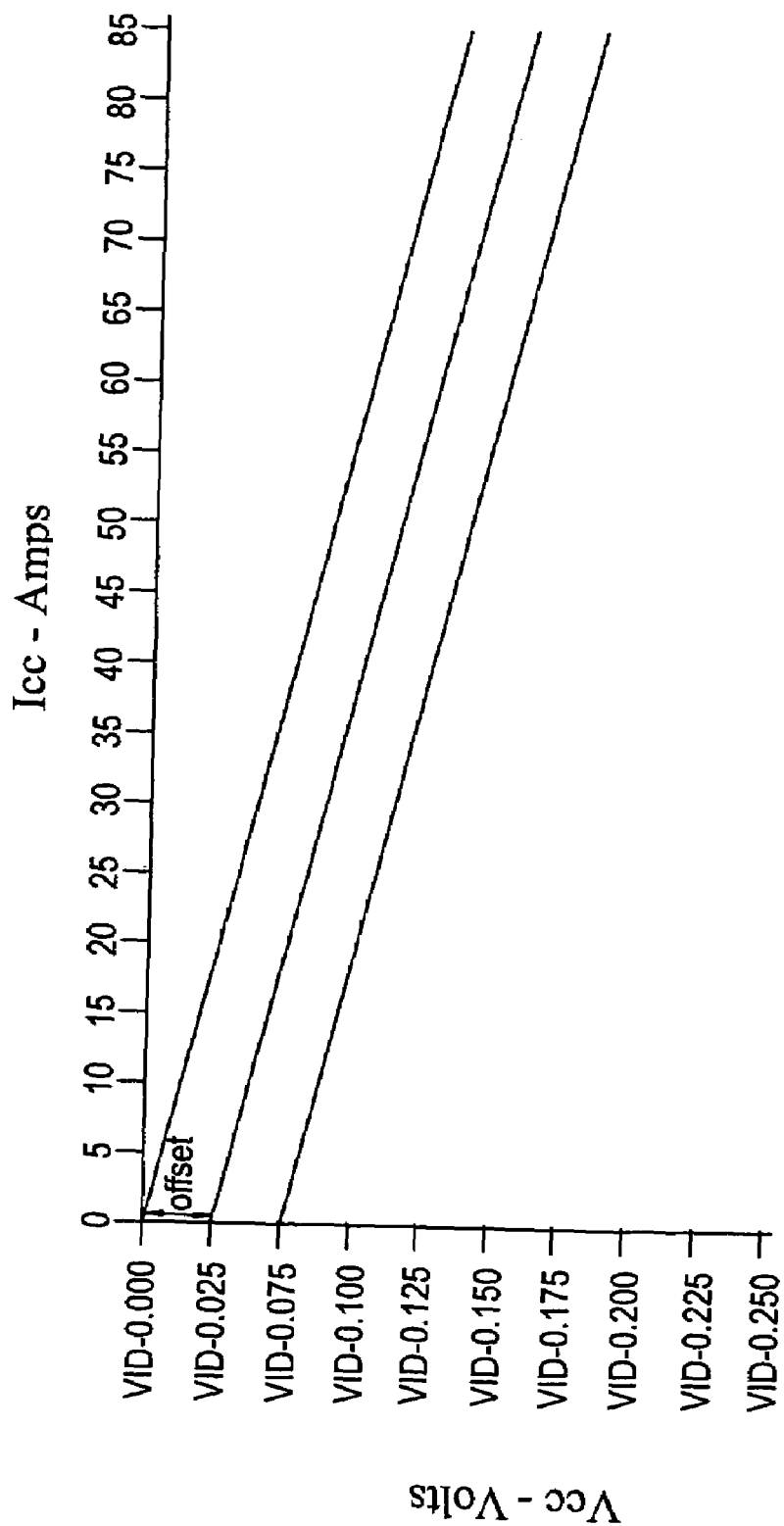
FIG. 2 shows relationships between current and voltage when a conventional voltage regulating system can support the level of the core voltage that the CPU requires.
Figure 3:
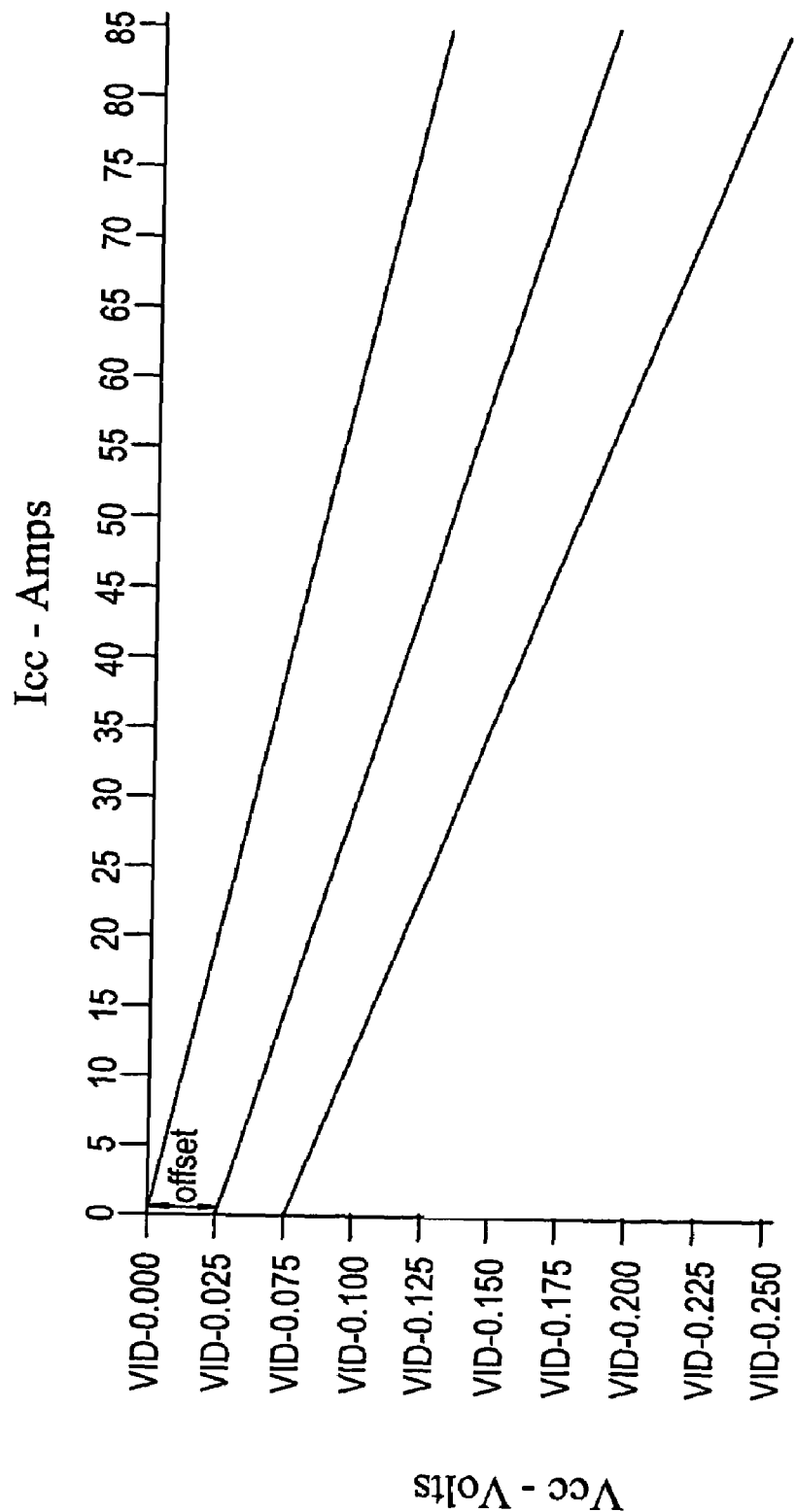
FIG. 3 shows relationships between the current and the voltage when the conventional voltage regulating system cannot support the level of the core voltage that the CPU requires.

Reference will now be made in detail to embodiments of the present invention, examples of which are illustrated in the accompanying drawings, wherein like reference numerals refer to like elements throughout. The embodiments are described below in order to explain the present invention by referring to the figures.

Figure 4:
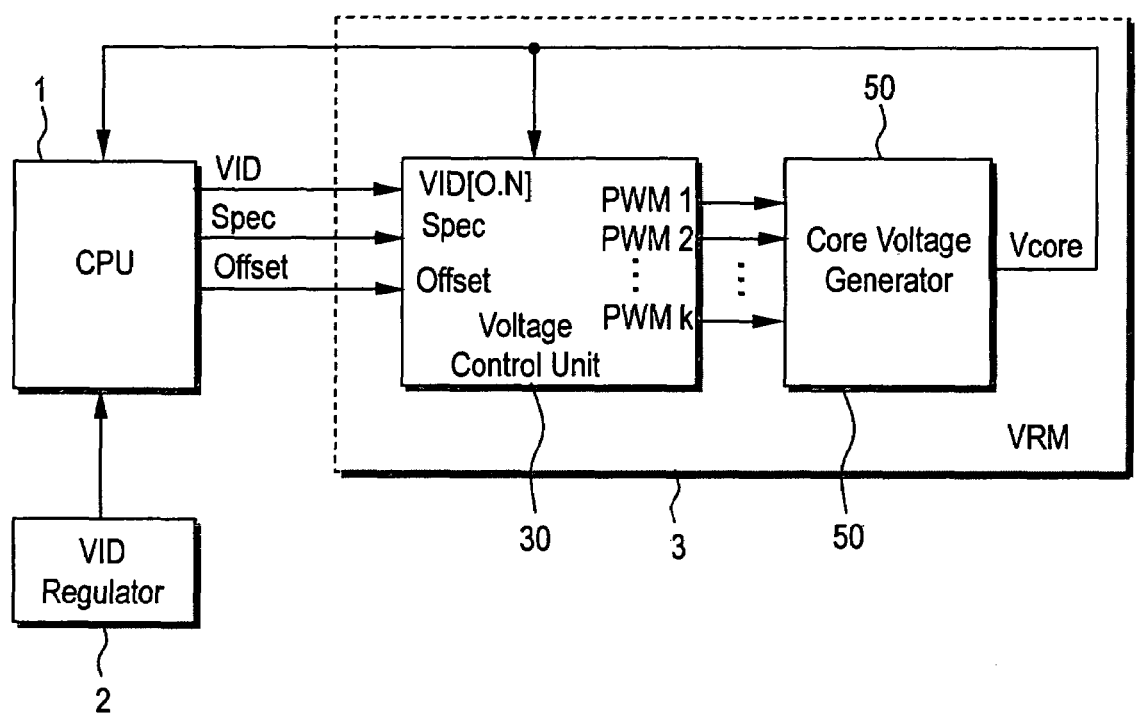
FIG. 4 is a control block diagram of the voltage regulating system of the CPU according to the present invention.

Referring now to FIG. 4, a voltage regulating system of a CPU according to the present invention comprises a CPU 1 which executes calculation or data process, and a a voltage regulator module (VRM) 3 which outputs a core voltage to the CPU 1.

The CPU 1 operates by the core voltage supplied from the VRM 3. The CPU 1 outputs a voltage identification (VID) signal for regulating a level of the core voltage, a spec signal for regulating a percent voltage regulation of the core voltage, and an offset signal for regulating an offset value of the core voltage, and transmits the VID signal, the spec signal and the offset signal to the VRM 3.

In an embodiment of the present invention the CPU 1 outputs 5-bit VID signals (VID{0.N}) through 5 VID pins in response to a VID voltage from a VID regulator 2. FIG. 6 is a reference table of relationships between the VID signals and the core voltages corresponding to the VID signals. The CPU 1 comprises an A/D converter to transform an analog VID signal from the VID regulator 2 into the 5-bit digital VID signals. Additionally, the CPU 1 according to the present invention is configured to output an analog spec signal and an analog offset signal, therefore the CPU 1 may further comprise a spec signal generator and an offset signal generator to generate the spec signal and the offset signal.

The voltage regulator module 3 comprises a core voltage generator 50 and a voltage regulation control unit 30. The core voltage generator 50 outputs the core voltage. The voltage regulation control unit 30 receives the VID signals, the spec signal, and the offset signal and triggers the core voltage generator 50 to generate the core voltage having the level of voltage, the percent voltage regulation, and the offset value, corresponding to the VID signals, the spec signal and the offset signal, respectively.

Figure 5:
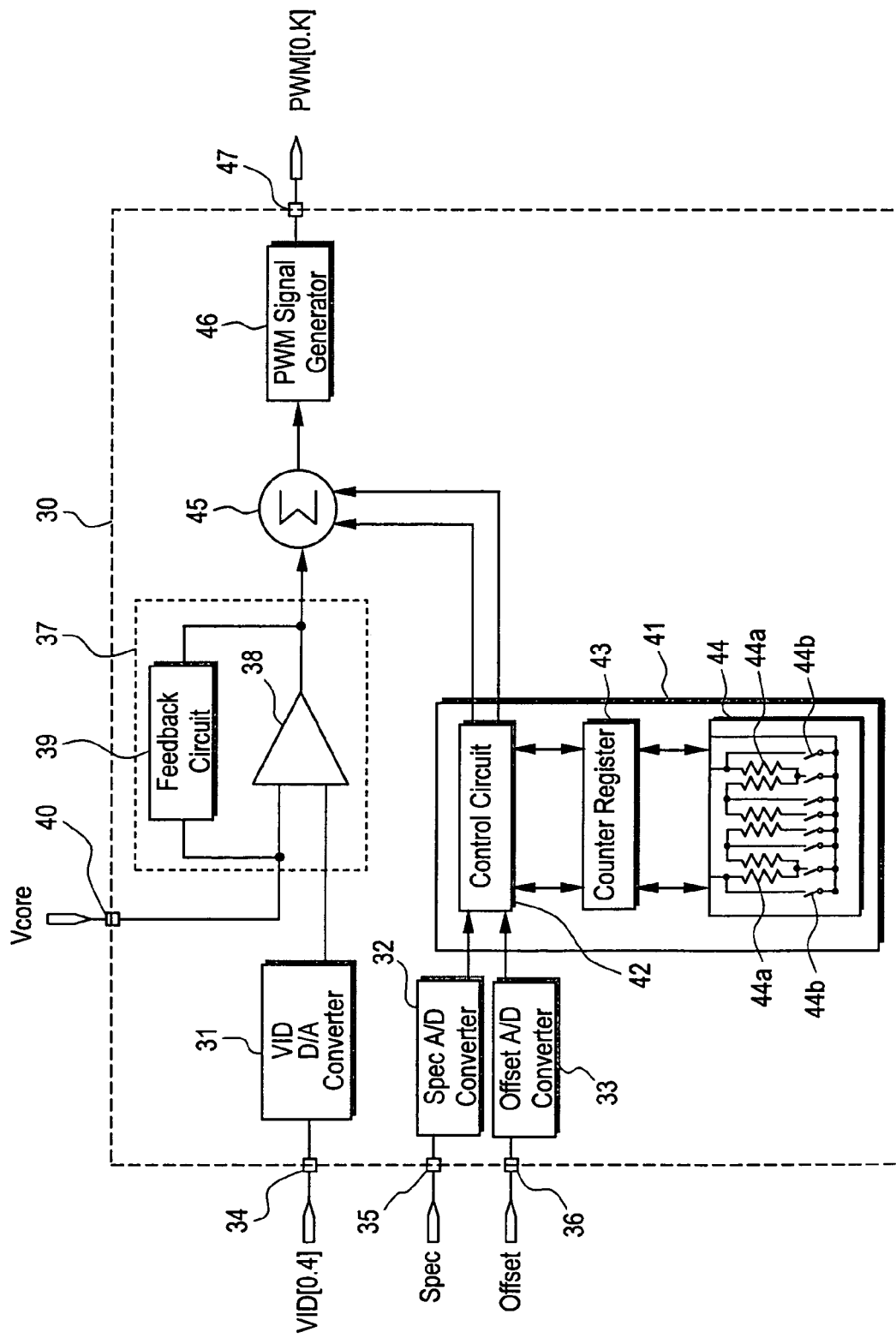
FIG. 5 is a control block diagram of a voltage regulation control unit of the voltage regulating system in FIG. 4.

FIG. 5 is a control block diagram of a voltage regulation control unit of the voltage regulating system in FIG. 4. As illustrated in FIG. 5, the voltage regulation control unit 30 according to the present invention comprises VID input pins 34 to receive the 5-bit VID signals from the CPU 1, and a VID D/A converter 31 to convert the 5-bit digital VID signals into an analog VID signal.

The analog VID signal converted by the VID D/A converter 31 is transmitted to a voltage level compensation unit 37. The voltage level compensation unit 37 according to the present invention operates as an error amplifier. Further particularly, the voltage level compensation unit 37 comprises a comparator unit 38, and a feedback circuit 39. The comparator unit 38 detects a difference between the voltage level of the analog VID signal converted by the VID D/A converter 31 and the level of the core voltage received from the core voltage generator 50 through a core voltage input pin 40. The voltage level compensation unit 37 outputs a voltage level compensation signal to compensate the level of the core voltage by regulating output current using the comparator unit 38 and the feedback circuit 39.

The voltage regulation control unit 30 further comprises a spec signal input pin 35 which receives the spec signal from the CPU 1, an offset signal input pin 36 which receives the offset signal from the CPU 1, and a programmable register 41. The programmable register 41 outputs a percent voltage regulation compensation signal and an offset value compensation signal to compensate the percent voltage regulation and the offset value of the core voltage, respectively. The voltage regulation control unit 30 according to the present invention further comprises a spec signal A/D converter 32 which converts the analog spec signal into a digital spec signal, and an offset signal A/D converter 33 which converts the analog offset signal into a digital offset signal. The transformed digital spec and offset signals are transferred to the programmable register 41.

The programmable register 41 comprises a resistor array 44 which selectively outputs a resistance value, a counter register 43 which stores the resistance value from the resistor array 44, and a control circuit unit 42 which outputs the percent voltage regulation compensation signal and the offset value compensation signal, corresponding to the digital spec signal from the spec A/D converter 32 and the digital offset signal from the offset A/D converter 33, respectively.

The resistor array 44 includes a plurality of resistance elements 44a, and at least one wiper element 44b which varies the resistance value by selectively contacting the resistance elements 44a. The control circuit unit 42 controls the wiper component 44b, based on the digital spec signal and the digital offset signal received, to vary the resistance value from the resistor array 44. The resistance value from the resistor array 44 is recorded in the counter register 43.

The control circuit unit 42 reads the resistance values from the counter register 43, corresponding to the digital spec signal and the digital offset signal, respectively, and outputs the percent voltage regulation compensation signal and the offset signal compensation signal, based on the read resistance values. The digital spec signal and the digital offset signal are used by the control circuit unit 42 as address information for the counter register 43.

The percent voltage regulation and offset compensation signals are transmitted from the control unit 42 to an adder 45, together with the voltage level compensation signal transmitted from the voltage level compensation unit 37. The adder 45 synthesizes the received signals to output a core voltage compensation signal.

The voltage regulation control unit 30 further comprises a PWM signal generator 46 to output a PWM signal having the duty ratio corresponding to the core voltage compensation signal from the adder 45. The PWM signal (PWM{0.K}) is transferred from the PWM signal generator 46 to the core voltage generator 50 through a PWM signal output pin 47.

On the basis of the PWM signal from the PWM signal generator of the voltage regulation control unit 30, the core voltage generator 50 outputs the core voltage having the percent voltage regulation, the offset value, and the level of voltage corresponding to the spec signal, the offset signal from the CPU 1, and the voltage level compensation signal from the voltage level compensation unit 37, respectively. In this way, the CPU 1 is supplied with the core voltage having characteristics the CPU 1 requires.

Alternatively, the CPU 1 may be configured to directly output the digital spec and offset signals so that transformation from analog values to digital values is not necessary. In such case, the spec A/D converter 32 and the offset A/D converter 33 in the voltage regulation control unit 30 may be removed. Thus, the digital spec and offset signals received by the spec signal input pin 35 and the offset signal input pin 36, respectively, of the voltage regulation control unit 30 are directly transferred to the programmable register 41.

In the embodiments described above, the voltage regulating system of the CPU 1 may be configured to compensate both the percent voltage regulation and the offset value of the core voltage, or the voltage regulating system may be configured to compensate only one of the percent voltage regulation and the offset value of the core voltage.

As described above, in the VRM 3 that receives the VID signal from the CPU 1 and supplies the CPU 1 with the level of the core voltage corresponding to the VID signal, the VRM 3 comprises the core voltage generator 50 to generate the core voltage, and the voltage regulation control unit 30 to receive the spec signal and the offset signal from the CPU 1 and to control the core voltage generator 50 to output the core voltage having the percent voltage regulation and the offset value corresponding to the spec signal and the offset signal, respectively. In this way, the CPU 1 is supplied with the core voltage having the voltage level, the percent voltage regulation, and the offset value that the CPU 1 requires regardless of the class of the CPU 1.

As described above, the VRM and the voltage regulating system according to the present invention can supply stable core voltage that the CPU requires, regardless of the class of the CPU, by receiving information on the voltage the CPU requires Although a few embodiments of the present invention have been shown and described, it would be appreciated by those skilled in the art that changes may be made in these embodiments without departing from the principles and spirit of the invention, the scope of which is defined in the appended claims and their equivalents.

What is claimed is:

1. A voltage regulator module (VRM) for receiving a voltage identification (VID) signal from a CPU to supply the CPU with a core voltage corresponding to the VID signal, the VRM comprising:
   a core voltage generator which generates the core voltage; and
   a voltage regulation control unit which determines a percent voltage regulation of the core voltage based on a spec signal from the CPU to control the core voltage generator to generate the core voltage having the percent voltage regulation corresponding to the spec signal.

2. The VRM according to claim 1, wherein the voltage regulation control unit comprises:
   a programmable register which outputs a percent voltage regulation compensation signal to compensate the core voltage, based on the spec signal; and
   a PWM signal generator which outputs a PWM signal to control the core voltage generator to generate the core voltage having the percent voltage regulation corresponding to the spec signal, based on the percent voltage regulation compensation signal from the programmable register.

3. The VRM according to claim 2, wherein:
   the spec signal from the CPU is an analog signal, and
   the voltage regulation control unit further comprises a spec A/D converter which converts the analog spec signal into a digital spec signal to transfer the digital spec signal to the programmable register.

4. The VRM according to claim 3, wherein the programmable register comprises:
   a resistor array which selectively outputs one of a plurality of resistance value;
   a counter register which stores the resistance value output from the resistor array; and a control circuit unit which reads the output resistance value corresponding to the spec signal from the counter register, to output the percent voltage regulation compensation signal corresponding to the read resistance value.

5. The VRM according to claim 2, wherein the voltage regulation control unit further comprises:
a VID D/A converter which converts the VID signal into an analog VID signal; and
a voltage level compensation unit which outputs a voltage level compensation signal to the PWM signal generator to compensate the level of the core voltage, by comparing the analog VID signal with the core voltage from the core voltage generator.

6. The VRM according to claim 5, wherein the voltage regulation control unit further comprises an adder which adds the percent voltage regulation compensation signal from the programmable register and the voltage level compensation signal from the voltage level compensation unit and transfers the added signal to the PWM signal generator.

7. A voltage regulator module (VRM) for receiving a voltage identification (VID) signal from a CPU to supply the CPU with a core voltage corresponding to the VID signal, the VRM comprising:
a core voltage generator which outputs the core voltage; and
a voltage regulation control unit which receives an offset signal which determines an offset value of the core voltage from the CPU to control the core voltage generator to generate the core voltage having the offset value corresponding to the offset signal.

8. The VRM according to claim 7, wherein the voltage regulation control unit comprises:
a programmable register which outputs an offset compensation signal to compensate the offset value of the core voltage, based on the offset signal from the CPU; and
a PWM signal generator which outputs a PWM signal to control the core voltage generator to generate the core voltage having the offset value corresponding to the offset signal, based on the offset compensation signal from the programmable register.

9. The VRM according to claim 8, wherein the offset signal from the CPU is an analog signal, and the voltage regulation control unit further comprises an offset A/D converter which converts the analog offset signal into a digital offset signal to transfer the digital offset signal to the programmable register.

10. The VRM according to claim 9, wherein the programmable register comprises:
a resistor array which selectively outputs one of a plurality of resistance values;
a counter register which stores the resistance value output from the resistor array; and
a control circuit unit which reads the output resistance value corresponding to the offset signal from the counter register to output the offset compensation signal corresponding to the read resistance value.

11. The VRM according to claim 8, wherein the voltage regulation control unit further comprises:
a VID D/A converter which converts the VID signal into the analog VID signal; and
a voltage level compensation unit which outputs a voltage level compensation signal to the PWM signal generator to compensate the level of the core voltage, by comparing the analog VID signal with the core voltage from the core voltage generator.

12. The VRM according to claim 11, wherein the voltage regulation control unit further comprises:
an adder which adds the offset compensation signal from the programmable register and the voltage level compensation signal from the voltage level compensation unit and transfers the added signal to the PWM signal generator.

13. A voltage regulator module (VRM) receiving a voltage identification (VID) signal from a CPU to supply the CPU with a core voltage corresponding to the VID signal, the VRM comprising:
a core voltage generator which outputs the core voltage; and
a voltage regulation control unit which controls the core voltage generator to generate the core voltage having a percent voltage regulation and an offset value corresponding to a spec signal and an offset signal, respectively, output by the CPU, wherein the percent voltage regulation is determined based on the spec signal and the offset value is determined based on the offset signal.

14. The VRM according to claim 13, wherein the voltage regulation control unit comprises:
a programmable register outputs a percent voltage regulation compensation signal and an offset compensation signal to compensate the percent voltage regulation and the offset value of the core voltage, respectively, based on the spec signal and the offset signal; and
a PWM signal generator which outputs a PWM signal to control the core voltage generator to generate the core voltage having the percent voltage regulation and the offset value corresponding to the spec signal and the offset signal, respectively, based on the percent voltage regulation compensation signal and the offset compensation signal from the programmable register.

15. The VRM according to claim 14, wherein at least one of the spec signal and the offset signal from the CPU is an analog signal, and the voltage regulation control unit further comprises an A/D converter which converts the at least one analog signal into a digital signal to transfer the digital signal to the programmable register.

16. The VRM according to claim 15, wherein the programmable register comprises:
a resistor array which selectively outputs one of a plurality of resistance values;
a counter register which stores the resistance value output from the resistor array; and
a control circuit unit which reads the resistance value output from the counter register corresponding to the spec signal and the offset signal, respectively, to output the percent voltage regulation compensation signal and the offset compensation signal corresponding to the read resistance value.

17. The VRM according to claim 15, wherein the voltage regulation control unit further comprises:
a VID D/A converter which converts the VID signal into an analog VID signal; and
a voltage level compensation unit which outputs a voltage level compensation signal to the PWM signal generator to compensate the level of the core voltage, by comparing the analog VID signal with the core voltage from the core voltage generator.

18. The VRM according to claim 17, wherein the voltage regulation control unit further comprises an adder which adds the percent voltage regulation compensation signal and the offset compensation signal output from the programmable register and the voltage level compensation signal output from the voltage level compensation unit and transfers the added signal to the PWM signal generator.

19. A voltage regulating system comprising:

a CPU which outputs a voltage identification (VID) signal which determines a level of a core voltage for operation of the CPU, a spec signal which determines a percent voltage regulation of the core voltage, and an offset signal which determines an offset value of the core voltage; and a voltage regulator module(VRM) comprising:

a core voltage generator which outputs the core voltage, and a voltage regulation control unit which controls the core voltage generator to generate the core voltage having the level of voltage, the percent voltage regulation, and the offset value corresponding to the VID signal, the spec signal, and the offset signal, respectively.

20. The voltage regulating system according to claim 19, wherein the voltage regulation control unit of the VRM comprises:

a programmable register which outputs the percent voltage regulation compensation signal and the offset compensation signal to compensate the percent voltage regulation and the offset value of the core voltage, based on the spec signal and the offset signal from the CPU; and a PWM signal generator which outputs a PWM signal to control the core voltage generator to generate the core voltage having the percent voltage regulation and the offset value corresponding to the spec signal and the offset signal, respectively, based on the percent voltage regulation compensation signal and the offset compensation signal from the programmable register.

21. A computer, comprising:

a CPU which outputs a voltage identification (VID) signal which decides a level of a core voltage for operation of the CPU, a spec signal which decides a percent voltage regulation of the core voltage, and an offset signal which decides an offset value of the core voltage; and a voltage regulator module (VRM) comprising:

a core voltage generator which outputs the core voltage, and a voltage regulation control unit which controls the core voltage generator to generate the core voltage having the level of voltage, the percent voltage regulation, and the offset value corresponding to the VID signal, the spec signal, and the offset signal, respectively.

22. The computer according to claim 21, wherein the voltage regulation control unit of the VRM comprises:

a programmable register which outputs the percent voltage regulation compensation signal and the offset compensation signal to compensate the percent voltage regulation and the offset value of the core voltage, based on the spec signal and the offset signal from the CPU; and a PWM signal generator which outputs a PWM signal to control the core voltage generator to generate the core voltage having the percent voltage regulation and the offset value corresponding to the spec signal and the offset signal, respectively, based on the percent voltage regulation compensation signal and the offset compensation signal from the programmable register.

23. The VRM of claim 4, wherein the control circuit controls the resistor array to selectively output the one of the plurality of resistance values based on the digital spec signal.

24. The VRM of claim 16, wherein the control circuit controls the resistor array to selectively output the one of the plurality of resistance values based on the spec signal and the offset signal.

* * * * *